United States Patent
Kozuch et al.

(10) Patent No.: US 7,024,555 B2
(45) Date of Patent: Apr. 4, 2006

(54) APPARATUS AND METHOD FOR UNILATERALLY LOADING A SECURE OPERATING SYSTEM WITHIN A MULTIPROCESSOR ENVIRONMENT

(75) Inventors: Michael A. Kozuch, Beaverton, OR (US); James A. Sutton, II, Portland, OR (US); David Grawrock, Aloha, OR (US); Gilbert Neiger, Portland, OR (US); Richard A. Uhlig, Hillsboro, OR (US); Bradley G. Burgess, Austin, TX (US); David I. Poisner, Folsom, CA (US); Clifford D. Hall, Orangevale, CA (US); Andy Glew, Portland, OR (US); Lawrence O. Smith, III, Beaverton, OR (US); Robert George, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1003 days.

(21) Appl. No.: 10/043,843

(22) Filed: Nov. 1, 2001

(65) Prior Publication Data

US 2003/0084346 A1    May 1, 2003

(51) Int. Cl.
*G06F 1/26* (2006.01)
(52) U.S. Cl. .................. 713/165; 713/168; 713/189; 713/193; 713/200; 713/201
(58) Field of Classification Search ............. 713/165, 713/168, 189, 193, 200, 201
See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |

(Continued)

FOREIGN PATENT DOCUMENTS

DE    4217444    12/1992

(Continued)

OTHER PUBLICATIONS

Brands, Stefan, "Restrictive Blinding of Secret-Key Certificates", *Springer-Verlag XP002201306*, (1995),Chapter 3.

(Continued)

*Primary Examiner*—Thomas R. Peeso
(74) *Attorney, Agent, or Firm*—Blakely, Sokoloff, Taylor & Zafman LLP

(57) ABSTRACT

An apparatus and method for unilaterally loading a secure operating system within a multiprocessor environment are described. The method includes disregarding a received load secure region instruction when a currently active load secure region operation is detected. Otherwise, a memory protection element is directed, in response to the received load secure region instruction, to form a secure memory environment. Once directed, unauthorized read/write access to one or more protected memory regions are prohibited. Finally, a cryptographic hash value of the one or more protected memory regions is stored within a digest information repository as a secure software identification value. Once stored, outside agents may request access to a digitally signed software identification value in order to establish security verification of secure software within the secure memory environment.

38 Claims, 10 Drawing Sheets

U.S. PATENT DOCUMENTS

| | | |
|---|---|---|
| 4,307,214 A | 12/1981 | Birney et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,529,870 A | 7/1985 | Chaum |
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Hotley et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubals |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | DiSanto |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,918 A | 5/1998 | Hopkins et al. |
| 5,757,919 A | 5/1998 | Herbert et al. |
| 5,764,969 A | 6/1998 | Kahle et al. |
| 5,784,625 A | 7/1998 | Walker |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakaumra |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Derek |
| 6,282,651 B1 | 8/2001 | Ashe |

| | | | |
|---|---|---|---|
| 6,282,657 B1 | 8/2001 | Kaplan et al. | |
| 6,292,874 B1 | 9/2001 | Barnett | |
| 6,301,646 B1 | 10/2001 | Hostetter | |
| 6,308,270 B1 | 10/2001 | Guthery et al. | |
| 6,314,409 B1 | 11/2001 | Schneck et al. | |
| 6,321,314 B1 | 11/2001 | Van Dyke | |
| 6,327,652 B1 | 12/2001 | England et al. | |
| 6,330,670 B1 | 12/2001 | England et al. | |
| 6,339,815 B1 | 1/2002 | Feng et al. | |
| 6,339,816 B1 | 1/2002 | Bausch | |
| 6,357,004 B1 | 3/2002 | Davis | |
| 6,363,485 B1 | 3/2002 | Adams | |
| 6,374,286 B1 | 4/2002 | Gee et al. | |
| 6,374,317 B1 | 4/2002 | Ajanovic et al. | |
| 6,378,068 B1 | 4/2002 | Foster | |
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,379 B1 | 5/2002 | Yates, Jr. et al. | |
| 6,412,035 B1 | 6/2002 | Webber | |
| 6,421,702 B1 | 7/2002 | Gulick | |
| 6,435,416 B1 | 8/2002 | Slassi | |
| 6,445,797 B1 | 9/2002 | McGough et al. | |
| 6,463,535 B1 | 10/2002 | Drews et al. | |
| 6,463,537 B1 | 10/2002 | Tello | |
| 6,499,123 B1 | 12/2002 | McFarland et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B1 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |
| 2001/0021969 A1 | 9/2001 | Burger et al. | |
| 2001/0027511 A1 | 10/2001 | Wakabayashi et al. | |
| 2001/0027527 A1 | 10/2001 | Khidekel et al. | |
| 2001/0037450 A1 | 11/2001 | Metlitski et al. | |
| 2002/0007456 A1 | 1/2002 | Peinado et al. | |
| 2002/0023032 A1 | 2/2002 | Pearson et al. | |
| 2002/0147916 A1 | 10/2002 | Strongin et al. | |
| 2002/0166061 A1 | 11/2002 | Falik et al. | |
| 2002/0169717 A1 | 11/2002 | Challener | |
| 2003/0018892 A1 | 1/2003 | Tello | |
| 2003/0074548 A1 | 4/2003 | Cromer et al. | |
| 2003/0115453 A1 | 6/2003 | Grawrock | |
| 2003/0126442 A1 | 7/2003 | Glew et al. | |
| 2003/0126453 A1 | 7/2003 | Glew et al. | |
| 2003/0159056 A1 | 8/2003 | Cromer et al. | |
| 2003/0188179 A1 | 10/2003 | Challener et al. | |
| 2003/0196085 A1 | 10/2003 | Lampson et al. | |
| 2004/0117539 A1 | 6/2004 | Bennett et al. | |

FOREIGN PATENT DOCUMENTS

| | | |
|---|---|---|
| EP | 0473913 | 3/1992 |
| EP | 0 492 692 | 7/1992 |
| EP | 0 602 867 A1 | 6/1994 |
| EP | 0600112 | 8/1994 |
| EP | 0892521 | 1/1999 |
| EP | 0930567 A | 7/1999 |
| EP | 0961193 | 12/1999 |
| EP | 0965902 | 12/1999 |
| EP | 1030237 A1 | 8/2000 |
| EP | 1055989 | 11/2000 |
| EP | 1056014 | 11/2000 |
| EP | 1085396 | 3/2001 |
| EP | 1146715 | 10/2001 |
| EP | 1 209 563 A2 | 5/2002 |
| EP | 1271277 | 1/2003 |
| JP | 02000076139 A | 3/2000 |
| WO | WO-9524696 | 9/1995 |
| WO | WO 97/29567 | 8/1997 |
| WO | WO9812620 | 3/1998 |
| WO | WO9834365 A | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO9957863 | 11/1999 |
| WO | WO-99/65579 | 12/1999 |
| WO | WO9965579 | 12/1999 |
| WO | WO-0021238 | 4/2000 |
| WO | WO0062232 | 10/2000 |
| WO | WO 01/27723 A1 | 4/2001 |
| WO | WO 01/27821 A2 | 4/2001 |
| WO | WO-0163994 | 8/2001 |
| WO | WO 01 75564 A | 10/2001 |
| WO | WO 01/75565 A2 | 10/2001 |
| WO | WO 01/75595 A2 | 10/2001 |
| WO | WO-0175565 | 10/2001 |
| WO | WO0201794 | 1/2002 |
| WO | WO 02 17555 A | 2/2002 |
| WO | WO02060121 | 8/2002 |
| WO | WO 02/086684 A | 10/2002 |
| WO | WO03058412 | 7/2003 |

OTHER PUBLICATIONS

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Intel, "IA-32 Intel Architecture Software Developer's Manual", *vol. 3: System Programming Guide*, Intel Corporation—2003, 13-1 through 13-24.

Kashiwagi, Kazuhiko, et al., "Design and Implementation of Dynamically Reconstructing System Software", *Software Engineering Conference*. Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn, et al., "Replacement Strategy for Aging Avionics Computers", *IEEE AES Systems Magazine*, XP002190614,(Mar. 1999).

Menezes, Oorschot, "Handbook of Applied Cryptography", *CRC Press LLC, USA XP002201307*, (1997),475.

Richt, Stefan, et al., "In-Circuit-Emulator Wird Echtzeittauglich", *Elektronic, Franzis Verlag GMBH, Munchen, DE*, vol. 40, No. 16, XP000259620,(100-103),Aug. 6, 1991.

Saez, Sergio, et al., "A Hardware Scheduler for Complex Real-Time Systems", *Proceedings of the IEEE International Symposium on Industrial Electronics*, XP002190615,(Jul. 1999),43-48.

Sherwood, Timothy, et al., "Patchable Instruction ROM Architecture", *Department of Computer Science and Engineering, University of California, San Diego, La Jolla, CA*, (Nov. 2001).

Intel Corporation, "Multiprocessor Specification Version 1.4", May 1997, XP-002155772.

Co-Pending CT Application No. PCT/US 02/34487, Int'l Search Report, mailed Dec. 13, 2004.

Coulouris, George , et al., "Distributed Systems, Concepts and Designs", *2nd Edition*, (1994),422-424.

Crawford, John , "Architecture of the Intel 80386", *Proceedings of the IEEE International Conference on Computer Design: VLSI in Computers and Processors (ICCD '86)*, (Oct. 6, 1986),155-160.

Fabry, R.S., "Capability-Based Addressing", *Fabry, R.S., "Capability-Based Addressing," Communications of the ACM*, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

HP Mobile Security Overview, "HP Mobile Security Overview", (Sep. 2002),1-10.

IBM Corporation, "IBM ThinkPad T30 Notebooks", *IBM Product Specification, located at* www-1.ibm.com/services/files/cisco_t30_spec_sheet_070202.pdf, last visited Jun. 23, 2004,(Jul. 2, 2002),1-6.

Intel Corporation, "IA-64 System Abstraction Layer Specification", *Intel Product Specification, Order No. 245359-001*, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture, Order No. 245318-001*, (Jan. 2000),i, ii, 5.1-5.3, 11.1-11.8, 11.23-11.26.

Menezes, Alfred J., et al., "Handbook of Applied Cryptography", *CRC Press Series on Discrete Mathematices and its Applications*, Boca Raton, FL, XP002165287, ISBN 0849385237,(Oct. 1996),403-405, 506-515, 570.

Nanba, S., et al., "VM/4: ACOS-4 Virtual Machine Architecture", *VM/4: ACOS-4 Virtual Machine Architecture, IEEE*, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithms, and Source Code C", *Wiley, John & Sons, Inc.*, XP0021111449; ISBN 0471117099,(Oct. 1995),169-187.

Schneier, Bruce, "Applied Cryptography: Protocols, Algorithms, and Source Code in C", *2nd Edition; Wiley, John & Sons, Inc.*, XP002251738; ISBN 0471128457,(Nov. 1995),28-33; 176-177; 216-217; 461-473; 518-522.

Partial International Search Report for co-pending PCT Appl. No. PCT/US 02/34487, mailed Jul. 15, 2004.

Heinrich, J., "MIPS R4000 Microprocessor User's Manual,"Apr. 1, 1993, MIPS, Mt. View, XP002184449, pp. 61-97.

Heinrich, J., "MIPS R4000 Microprocessor User's Manual," 1994, MIPS Technology Inc., Mountain View, CA, pp. 67-79.

"M68040 User's Manual," 1993, Motorola, Inc., pp. 1-20.

"Intel 386 DX Microprocessor 32-BIT CHMOS Microprocessor With Integrated Memory Management," Dec. 31, 1995, Intel, Inc., pp. 32-56; figures 4-14.

Berg, C., "How Do I Create a Signed Applet?," Dr. Dobb's Journal, M&T Publ., Redwood City, CA, US, vol. 22, No. 8, Aug. 1997, pp. 109-111, 122.

Gong, L., et al., "Going Beyond the Sandbox: An Overview of the New Security Architecture in the Java Development Kit 1.2," Proceedings of the Usenix Symposium on the Internet Technologies and Systems, Monterrey, CA Dec. 1997, pp. 103-112.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1-31.

"Information Display Technique for a Terminate Stay Resident Program," IBM Technical Disclosure Bulletin, TDB-ACC-No. NA9112156, Dec. 1, 1991, pp. 156-158, vol. 34, Issue No. 7A.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

"Trust Computing Plaltform Alliance (TCPA)", Main Specification Version 1.1a, Compaq Computer Corp., Hewlett-Packard Co., IBM Corp., Intel Corp., Microsoft Corp., Dec. 2001.

Menezes, Vanstone, Oorschot: "Handbook of Applied Cryptography", CRC Press LLC, USA, 1997, pp. 405-406, 409-410, 433-435, 576-580, XP002343062.

Copy of ISR in related application serial No. PCT/US2005/016559, mailed Dec. 12, 2005.

SECURE MEMORY ENVIRONMENTS

APPARATUS AND METHOD FOR UNILATERALLY LOADING A SECURE OPERATING SYSTEM WITHIN A MULTIPROCESSOR ENVIRONMENT

FIELD OF THE INVENTION

The invention relates generally to the field of computer security. More particularly, the invention relates to a method and apparatus for unilaterally loading a secure operating system within a multiprocessor environment.

BACKGROUND OF THE INVENTION

As computers become more integrated into our society, the need for computer security drastically increases. Recently, Internet commerce has experienced a vast growth over the computer networks of the world. Unfortunately, unless Internet commerce is adequately protected, using full-proof computer security mechanisms, the potential for computer piracy may one day erode consumer confidence. In other words, computer users which provide confidential information in order to acquire products and services must have adequate insurance that the information will not be intercepted by computer pirates.

As a result, many computer systems now incorporate vital security features such as encryption, source verification, trusted environment, as well as additional security features. As such, current online computer systems generally rely on transitive trust relationships. The public key infrastructure (PKI) is an example of such a transitive trust model. Under the public key infrastructure, a certification authority may provide an individual with a private key that only the user is aware of.

Accordingly, when the user provides information, it may be encrypted using the computer user's private key. As such, a recipient of the encrypted information may obtain a public key in order to decrypt the encrypted information by contacting a certification authority. In addition, a source of information may also be authenticated by digitally signing messages, which may also be decrypted in order to verify a source of information.

As one can see, the PKI provides mechanisms which ensure security for one-to-one relationships. However, relationships can quickly grow beyond one-to-one interactions, which require transitive trust to ensure security. Unfortunately, trust is generally not transitive. For example, an individual may trust a certification authority and receive an issued extrinsic certificate from the certification authority. Following issuance of the certificate, the certification authority may decide to trust a further individual and grant the individual access and control to all of the issued certificates, including of course the initial individual's certificate.

Unfortunately, the initial individual may not trust the subsequent individual which is trusted by the certification authority. Accordingly, had the individual known that the certification authority trusted the subsequent individual prior to issuance of the certificate, the individual probably would not have requested the certificate. As such, the problem illustrates that transitive trust is neither symmetric nor transitive nor distributed. In other words, the only reliable trust is self-trust, which cannot have an unknown subsequent individual which is trusted by the certification authority following an initial formation of trust. Although trust of a third party is not always unreliable, it cannot always be reliably estimated.

In some computer systems, the user or system administrator may desire to load a trustable operating system. By trustable, what is meant is that the user, or a third party requires a mechanism for inspecting the system and determining whether a given operating system was loaded. Once verification of loading of the operating system is complete, an outside agent may also desire to determine whether the operating system was loaded in the secure environment. Unfortunately, this capability cannot be supported with conventional transitive trust models, such as the public key infrastructure. Therefore, there remains a need to overcome one or more of the limitations in the above-described existing art.

BRIEF DESCRIPTION OF THE DRAWINGS

The present invention is illustrated by way of example, and not by way of limitation, in the figures of the accompanying drawings and in which.

DETAILED DESCRIPTION

Figure 1:
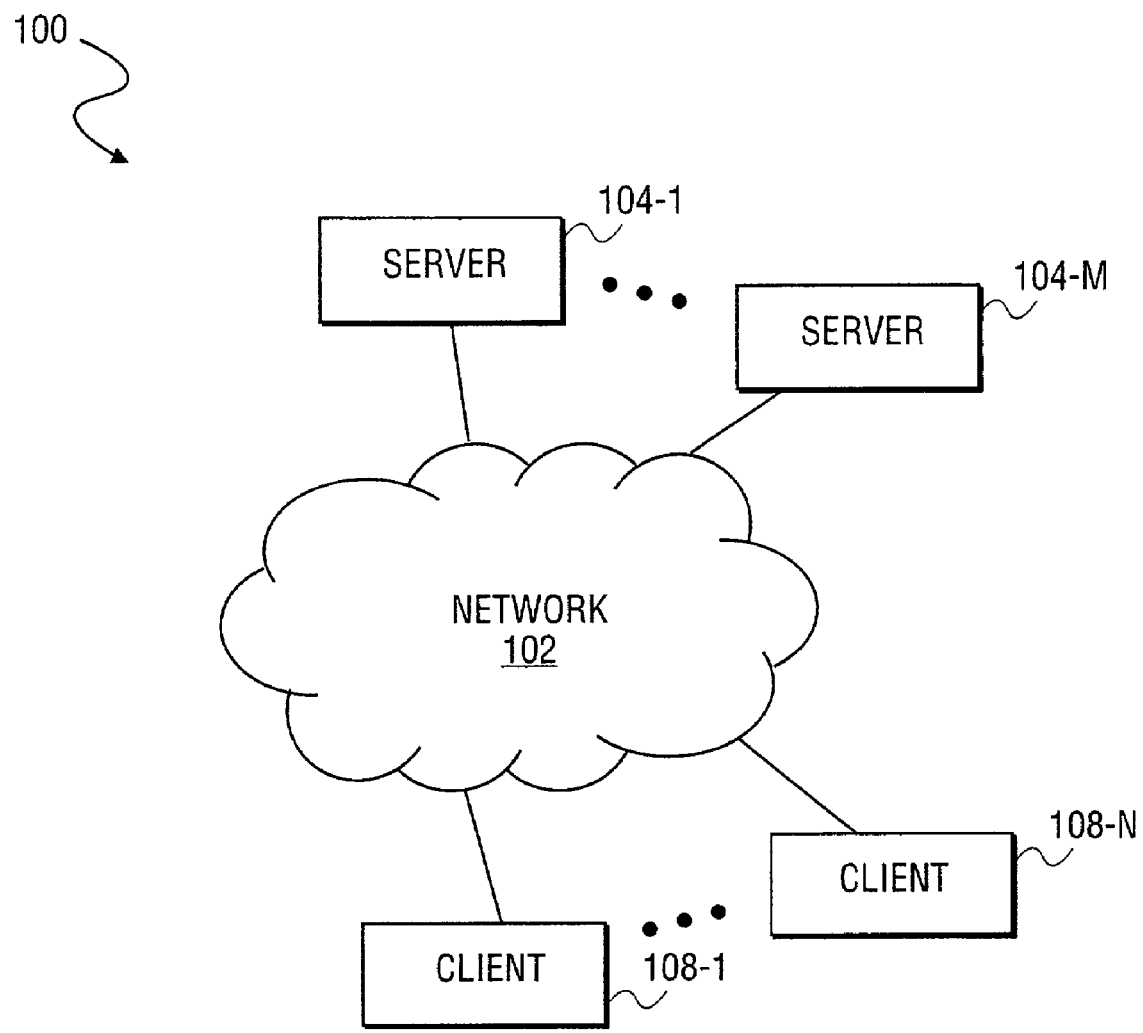
FIG. 1 depicts a block diagram illustrating a network computer environment as known in the art.

A method and apparatus for unilaterally loading a secure operating system within a multiprocessor environment are described. The method includes disregarding a received load secure region instruction when a currently active load secure region instruction is detected. Otherwise, a memory protection element is directed, in response to the received load secure region instruction, to form a secure memory environment. Once directed, unauthorized read/write access to one or more protected memory regions of the secure memory environment is prohibited. Finally, a cryptographic hash value of the one or more protected memory regions is stored within a digest information repository. Once stored, outside agents may request access to the encrypted identification information in order to establish security verification of a secure operating system is within the secure environment.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software.

One of skill in the art will immediately appreciate that the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

System Architecture

Referring now to FIG. 1, FIG. 1 depicts a network environment 100 in which the techniques of the present invention may be implemented. As shown, the network environment includes several computer systems such as a plurality of servers 104 (104-1, . . . , 104-M) and a plurality of clients 108 (108-1, . . . , 108-N), connected to each other via a network 102. The network 102 may be, for example, the Internet. Note that alternatively the network 102 might be or include one or more of: a Local Area Network (LAN), Wide Area Network (WAN), satellite link, fiber network, cable network, or a combination of these and/or others. The method and apparatus described herein may be applied to essentially any type of communicating means or device whether local or remote, such as a LAN, a WAN, a system bus, a disk drive, storage, etc.

Figure 2:
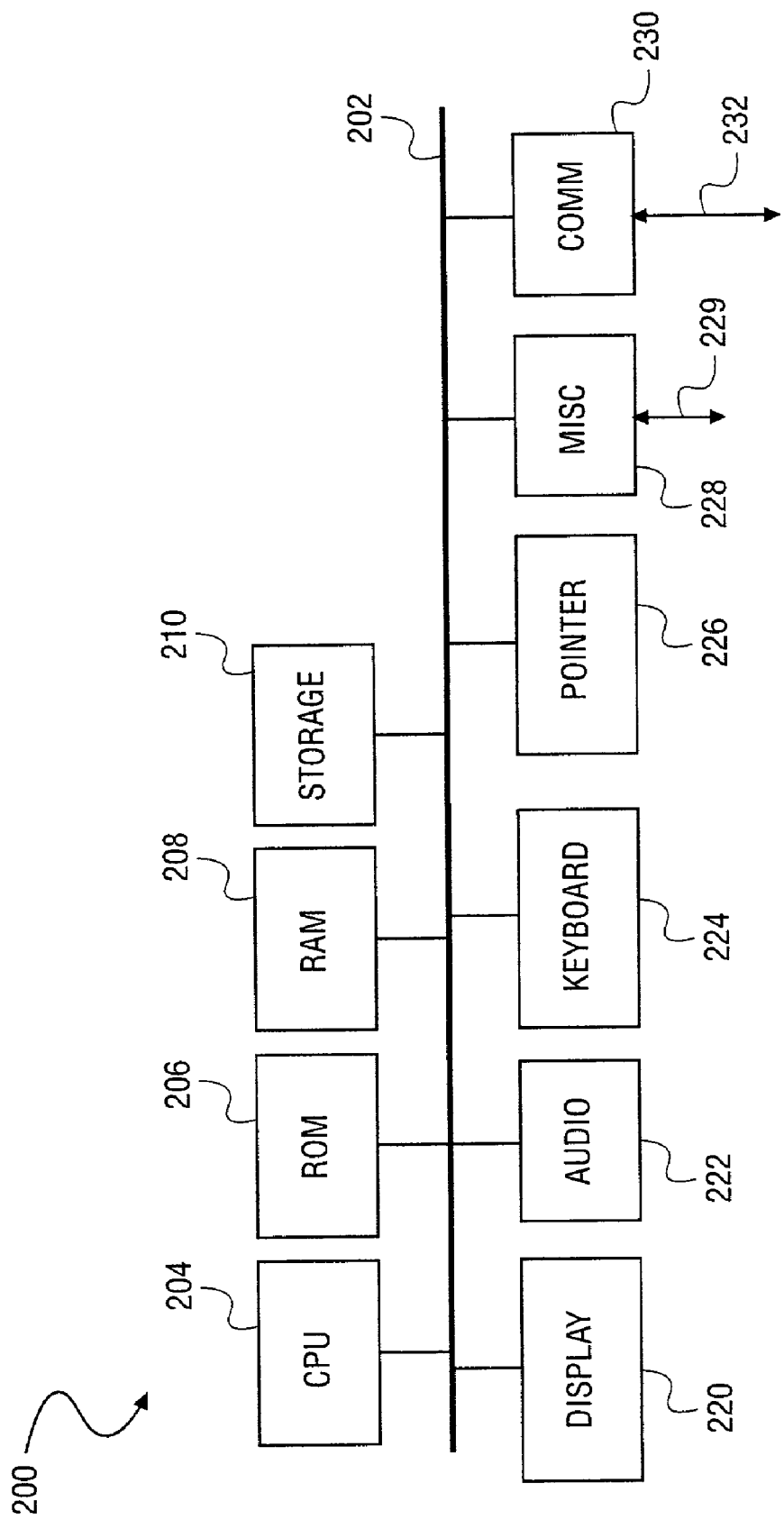
FIG. 2 depicts a block diagram illustrating a conventional computer system.

Referring to FIG. 2, FIG. 2 illustrates a conventional personal computer 200 in block diagram form, which may be representative of any of the clients 108 and servers 104, shown in FIG. 1. The block diagram is a high level conceptual representation and may be implemented in a variety of ways by various architectures. The computer 200 includes a bus system 202, which interconnects a Central Processing Unit (CPU) 204, a Read Only Memory (ROM) 206, a Random Access Memory (RAM) 208, a storage 210, a display 220, an audio 222, a keyboard 224, a pointer 226, miscellaneous input/output (I/O) devices 228, and communications 230.

The bus system 202 may be for example, one or more of such buses as a system bus, Peripheral Component Interconnect (PCI), Advanced Graphics Port (AGP), Small Computer System Interface (SCSI), FireWire, etc. The CPU 204 may be a single, multiple, or even a distributed computing resource. The ROM 206 may be any type of non-volatile memory, which may be programmable such as, mask programmable, flash, etc.

In addition, RAM 208 may be, for example, static, dynamic, synchronous, asynchronous, or any combination. The storage 210 may be Compact Disc (CD), Digital Versatile Disk (DVD), hard disks (HD), optical disks, tape, flash, memory sticks, video recorders, etc. While the display 220 might be, for example, a Cathode Ray Tube (CRT), Liquid Crystal Display (LCD), a projection system, Television (TV), etc. Audio 222 may be a monophonic, stereo, three dimensional sound card, etc.

The keyboard 224 may be a keyboard, a musical keyboard, a keypad, a series of switches, etc. The pointer 226, may be, for example, a mouse, a touchpad, a trackball, joystick, etc. While the I/O devices 228 may be a voice command input device, a thumbprint input device, a smart card slot, a Personal Computer Card (PC Card) interface, virtual reality accessories, etc., which may optionally connect via an input/output port 229 to other devices or systems. An example of a miscellaneous I/O device 228 would be a Musical Instrument Digital Interface (MIDI) card with the I/O port 229 connecting to the musical instrument(s).

The communications device 230 might be, for example, an Ethernet adapter for local area network (LAN) connections, a satellite connection, a settop box adapter, a Digital Subscriber Line (xDSL) adapter, a wireless modem, a conventional telephone modem, a direct telephone connection, a Hybrid-Fiber Coax (HFC) connection, cable modem, etc. While the external connection port 232 may provide for any interconnection, as needed, between a remote device and the bus system 202 through the communications device 230.

For example, the communications device 230 might be an Ethernet adapter, which is connected via the connection port 232 to, for example, an external DSL modem. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

Referring back to FIG. 1, the plurality of clients 108 are effectively connected to web sites, application service providers, search engines, and/or database resources represented by servers, such as the plurality of servers 104, via the network 102. The web browser and/or other applications are generally running on the plurality of clients 108, while information generally resides on the plurality of servers 104. For ease of explanation, a single server 104, or a single client 108-1 will be considered to illustrate one embodiment of the present techniques. It will be readily apparent that such techniques can be easily applied to multiple clients, servers, or the like.

Figure 3:
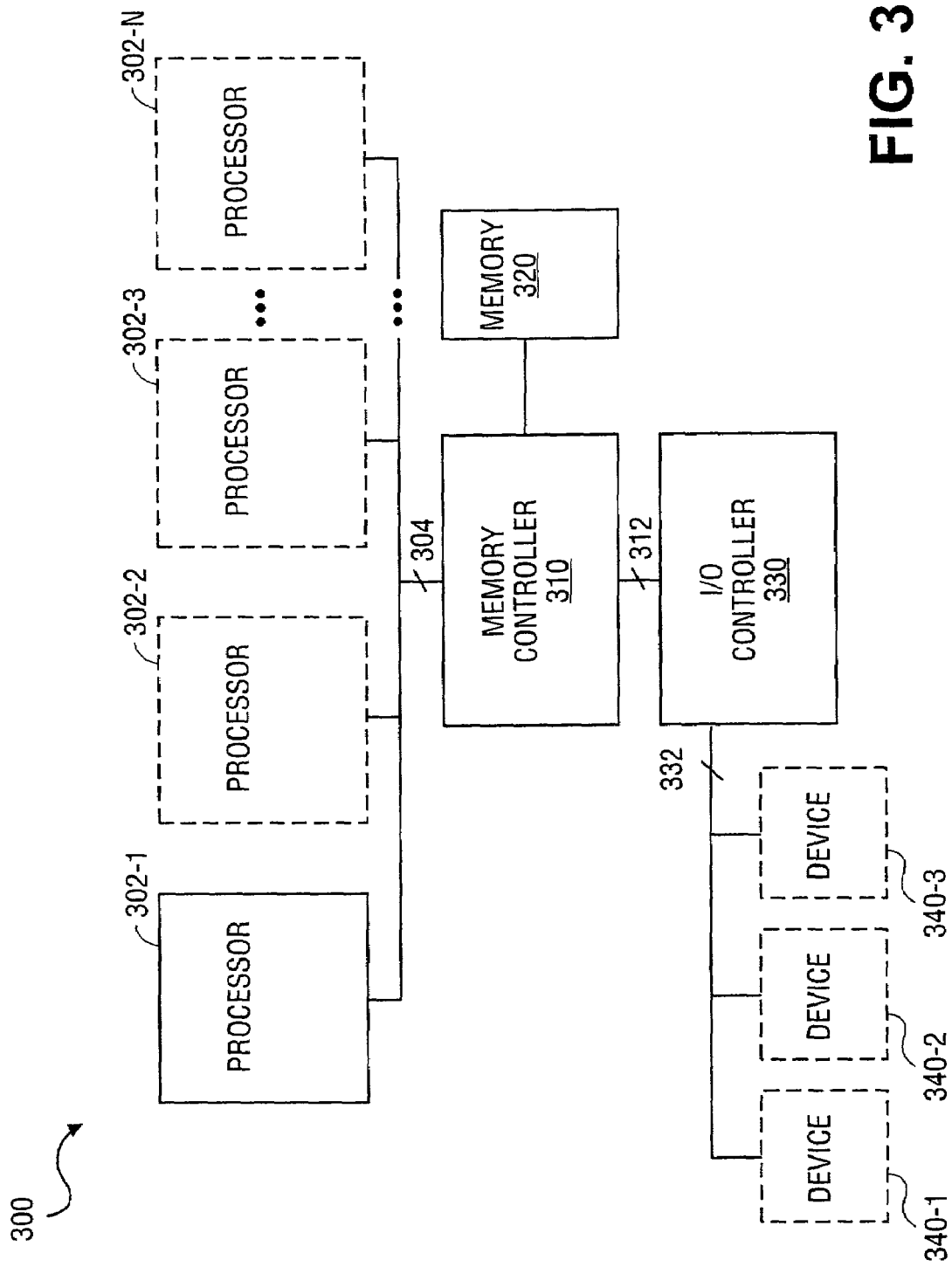
FIG. 3 depicts a block diagram illustrating a system wherein the present invention may be practiced in accordance with an embodiment of the present invention.

Referring now to FIG. 3, FIG. 3 depicts a block diagram of a multiprocessor environment computer system 300, which may be utilized by anyone of the clients or servers as depicted in FIG. 1. The multiprocessor computer system 300 includes a plurality of processors 302 (302-1, . . . , 302-N) coupled to a memory controller 310 via a bus 304. The memory controller 310 includes a memory 320 and is coupled to an I/O controller 330 via a second bus 312. The I/O controller 330 may include one or more devices 340 (340-1, 340-2 and 340-3) coupled via a bus 332.

In a computer system, such as depicted in FIG. 3, a user or system administrator may desire to load a trustable operating system. As referred to herein, the term trustable refers to the capability provided to either the user or a third party to later inspect the system 300 and determine whether a given operating system was loaded. Once determination of whether the given operating system was loaded, the user or third party may further determine whether the operating system has been loaded into a secure memory environment. This mechanism is not provided in conventional operating systems.

However, the described mechanism is of particular interest because it allows the trustable operating system to be loaded after untrusted software components have run. Moreover, this capability is robust in the presence of malicious software that may be attempting to compromise the computer system 300 from, for example, another processor in a multiprocessor system, while the system 300 may be attempting to register trustable software components.

As such, in a typical computer system, a processor 302 enforces privilege levels. These privilege levels restrict which system resources a particular software component may access. Accordingly, in a conventional system, such as depicted in FIG. 3, a user or third party is currently not available to load a trusted operating system via a unilateral request to one of the processors 302. As described in further detail below, a load (load secure region) instruction is provided in response to which load (load secure region) operation is performed to create a protected or secure memory environment in which a selected operating system may run with full privileges as a trusted operating system. Accordingly, as described herein reference is made, interchangeably, to a load instruction or a load secure region (LSR) instruction. In addition, reference is made, interchangeably, to a load operation or a load secure region (LSR) operation, performed in response to issuance of a load/LSR instruction.

Figure 4:
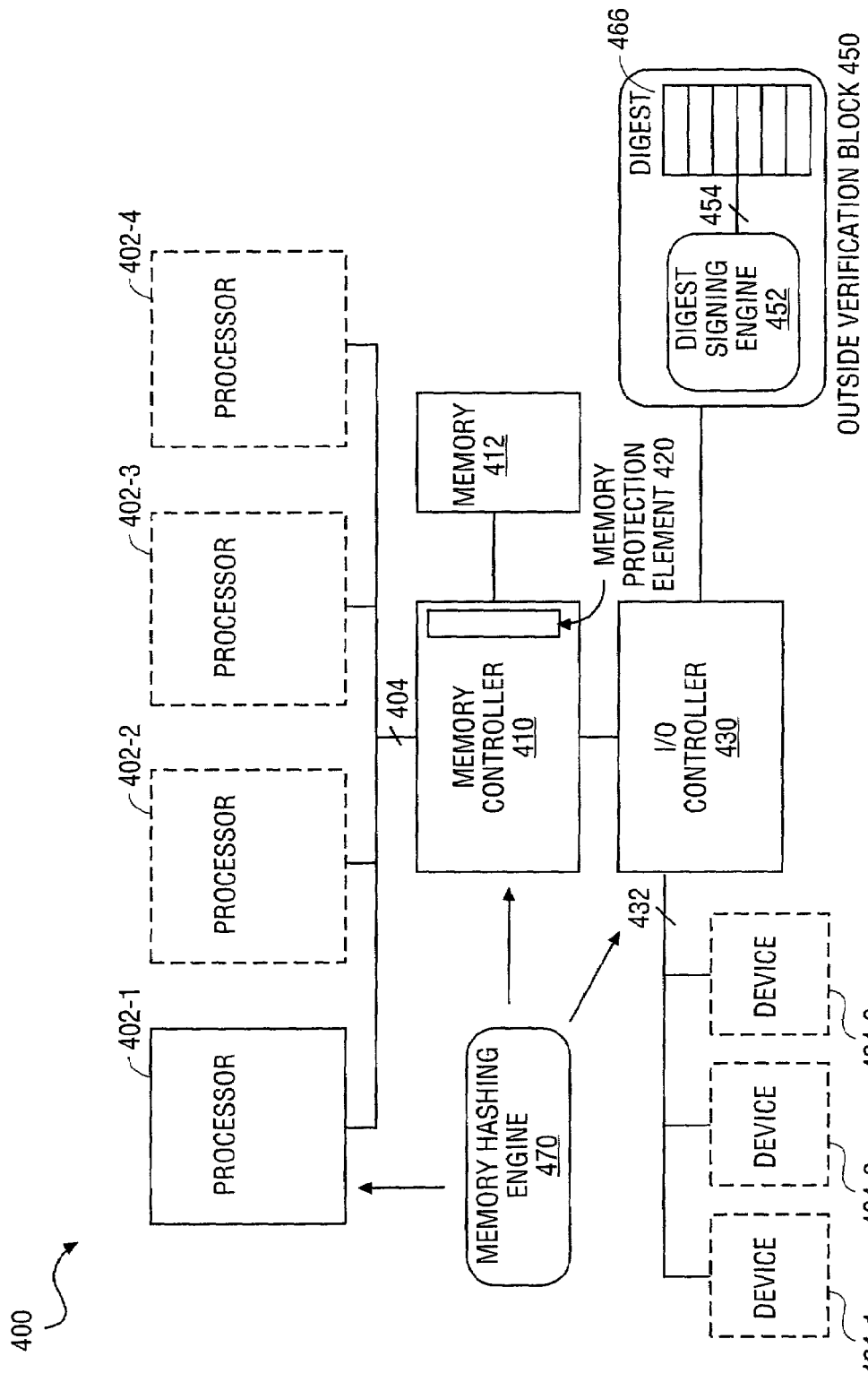
FIG. 4 depicts a block diagram illustrating a multiprocessor computer system for loading a trustable operating system in accordance with a further embodiment of the present invention.

Accordingly, FIG. 4 depicts a computer system 400 which includes the capability for unilaterally loading a trustable operating system within a secure memory environment. The mechanism provided is robust in the presence of malicious software that may be attempting to compromise the computer system 400 from another processor of the multiprocessor system while the system is registering trustable software components. Accordingly, the computer system 400 is more or less configured as depicted in FIG. 4, however, in the embodiment described, the memory controller includes the memory protection element 402 as well as a third party verification block 450 as well as a memory hashing engine 470. Although provided in a specific embodiment, the computer system 400, as depicted in FIG. 4, represents an abstraction of a computer system utilized by any of the clients 108 or servers 104 as depicted in FIG. 1. However, those skilled in the art will appreciate that the distinction between the various components of the computer system 400 is a logical distinction only. In practice, any of the components may be integrated into the same silicon die divided into multiple die or a combination of both. In addition, the various components may be performed in microcode, software or device specific components.

As described herein, a certain memory region is considered to contain the trustable operating system which the user or system administrator desires to load. In one embodiment, this memory region contains a portion of the trustable operating system which executes with full privilege. As a result, the computer system 400 requires a mechanism for preventing untrusted software and devices from corrupting the secure memory environment. Accordingly, in a typical computer system, a mechanism is necessary for regulating processor or device memory transactions into the secure memory region.

In the embodiment depicted in FIG. 4, the memory controller 410 of the computer system 400 is responsible for forwarding a received memory transaction to the appropriate destination. However, in contrast to conventional computer systems, the memory controller 410 includes a memory protection element 420. In the embodiment described, the memory protection element 420 is a special structure which may block certain memory accesses from proceeding to memory 412. Writes that are blocked by the structure are discarded without affecting memory. In addition, depending on the system requirements, reads may return values in which all the bits are clear, in which the bits are all set, or random values.

Accordingly, the memory protection element may be utilized by initiation software in order to set up one or more memory regions as a secure memory environment described above. In addition, the initiation software may load desired software or an operating system within the designated memory regions of the secure memory environment. Once loaded, the software or operating system functions as secure software or a trustable operating system once the secure memory environment containing the software or operating system is created.

As a result, once the memory regions forming the secure memory environment are created, the memory protection element will protect the environment from corruption. Accordingly, once the secure memory environment is created, the software or operating system contained therein is considered to be trustable. In addition to the memory protection elements 420, the computer system 400 includes an outside verification block 450. In one embodiment, the outside verification block is utilized in order to establish trust verification to an outside agent of the operating system or secure software contained within the secure memory region.

Accordingly, in one embodiment, an outside agent may establish trust or decide to trust the operating system contained within the secure memory environment by being provided the capability to inspect the software which resides in the secure memory environment. In one embodiment, rather than expose the entire region to inspection, the computer system 400 exposed a cryptographic hash value which represents the secure memory region. This value is generated by a memory hashing engine 470 after the region is secured and stored in a digest 460. In one embodiment, the cryptographic hash value of the secure memory environment represents a software identification value of the secure environment contained therein.

As such, once the secure software identification value is generated, the system 400 may store the secure software identification value in a digest 460. In one embodiment, the digest is a repository of information, which may be transmitted to an outside agent for the purposes of establishing trust. In the embodiment described, these values may be read and cryptographically signed by a hash signing engine 452 before being transmitted to the outside agent. As such, in the embodiment described, the digest 460 represents a bank of digest registers, which are accessed by the digest signing engine 452 via a secure channel 454.

Accordingly, the digest signing engine 452 utilizes the secure channel 454 to access the digest 460 and will sign the contents upon receiving a request to do so from an outside agent. By requesting such a signing, an outside agent may observe the stated components reported by the signed software identification value and decide whether or not to trust the computer system 400. In one embodiment, the digitally signed secure software identification value may be stored in a hardware token, which is accessible by the outside agent. This is provided in order to avoid software-to-software verification which may be easily circumvented in the presence of malicious software that may be attempting to compromise the computer system.

Figure 5A:
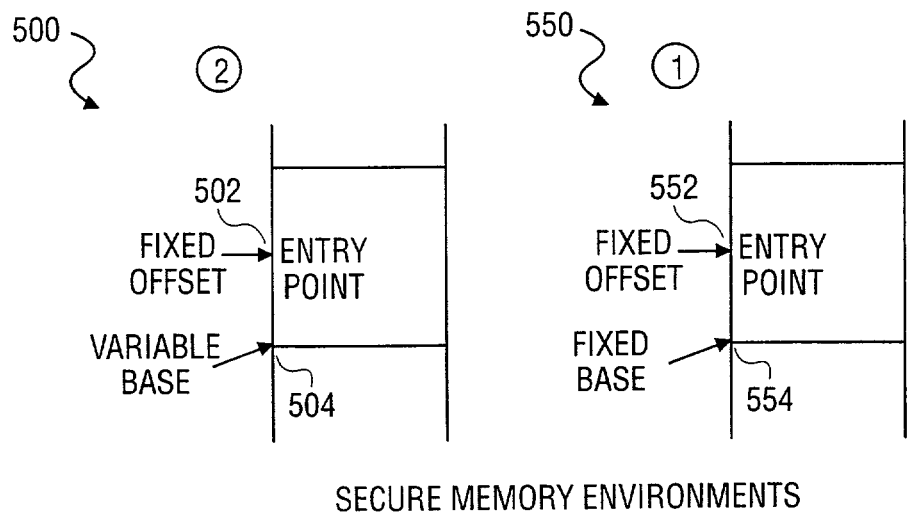
FIGS. 5A and 5B depict block diagrams illustrating secure memory environments in accordance with a further embodiment of the present invention.

Referring now to FIG. 5A, FIG. 5A depicts secure memory environments 500 and 550 formed in accordance with an embodiment of the present invention. In one embodiment, the secure memory environments are formed in response to issuance of a load secure region instruction. In one embodiment, in response to issuance of the load secure region (LSR) instruction by security initiation software, a load secure region (LSR) operation is performed. As a result, the security initiation software will select software or an operating system which it desires to become the secure software. Next, the secure software will direct the loading of the selected software within a designated memory region.

Once the software or operating system is loaded, the memory region within which the operating system is loaded will be designated by the initiation software, via an LSR instruction, to become the secure memory environment. Accordingly, the LSR instruction will be provided to a processor 402 (FIG. 4) which will execute an LSR operation directing the processor to unilaterally begin formation of the secure memory environment without cooperation from any of the other processors (402-2 through 402-4). In doing so, the processor 402 will establish an LSR exclusivity mutex to ensure that a current LSR instruction is not being performed.

As such, the processor will perform a series of actions, including verification that the initiation software is permitted to issue such an instruction (e.g., a privilege level check), followed by direction of the memory protection element to secure the designated secure memory environment. Once this is performed, the processor may collect information regarding the secure memory environment as well the identification as the initiating processor and record this information within the digest. As such, the processor will commit all values within the digest and direct the hashing engine to compute the secure software identification value, which will be stored in the digest and can be provided to an outside agent in order to establish verification.

Referring again to FIG. 5A, the initial software may request a secure memory environment 550 which includes a fixed base 554 and a fixed offset or entry point 552 in which each of the processors will be directed to following the issuance of a secure reset (SRESET), described in further detail below, operation once the secure memory region is formed. In addition, the secure memory environment 500 may include a variable base address 504 and a fixed offset entry point in which to direct each of the processors once the SRESET command is issued.

Accordingly, as described in further detail below, the SRESET command will force each of the processors to clear all outstanding transactions, memory information, tasks, code state and the like. In addition, the processors are directed to a specific entry point as depicted in FIG. 5A, such that the first operation performed following an SRESET is within the trustable operating system contained within the secure memory environment. In addition, at the time of SRESET, all processors in the system enter one of a plurality of known, privileged states, $S_1, S_2, \ldots S_N$.

In one embodiment, each of these states may be described by a set of parameters (e.g., initial privilege level, operating mode, register values, control values, etc.) that are either read from the platform at the time of SRESET (in which case, the values of the parameters are recorded, either directly or indirectly, in the digest log), or as part of the configuration of the processors. For example, in one embodiment, the privilege mode of the processors following SRESET is fixed; it may be encoded in the processors' SRESET microcode sequences. However, the address at which the processor starts executing instructions following an SRESET operation may be fetched from the platform at the time of the SRESET.

In one embodiment, the data storage elements within the processor are set to constant values. Accordingly, the constant values may either be stored in, for example, a ucode ROM (e.g. STORE the value 0x55AA into register N). Alternatively, the consent values may be hardwired into the operation of the chip (e.g. upon receiving a RESET signal, all flip-flops in one section of the chip are reset/set). Finally, the values may be derived from algorithms expressed in the ucode ROM (e.g. for each address in a cache store the address of the element into the element).

In an alternate embodiment, data storage elements within the processors are set to specified parameter values. Accordingly, the parameters may be specified by the initiation software at the time of issuing the LSR instruction. These parameters may not be the exact values stored in the register. For example, a particular parameter may indicate, for example, "paging-enabled." The processor will know how to translate that parameter into STORE values A, B, and C into registers X, Y, and Z. At the time of issuing the LSR, these parameters are either (1) stored in a predetermined location within the platform (e.g. the digest, the chipset, or the initiating processor) or (2) transmitted to all processors. At the time of issuing an SRESET, then, each processor either (1) fetches the parameters from the storage location(s) or (2) already has its copy of all interesting parameters. The starting code address is one such parameter.

Figure 5B:
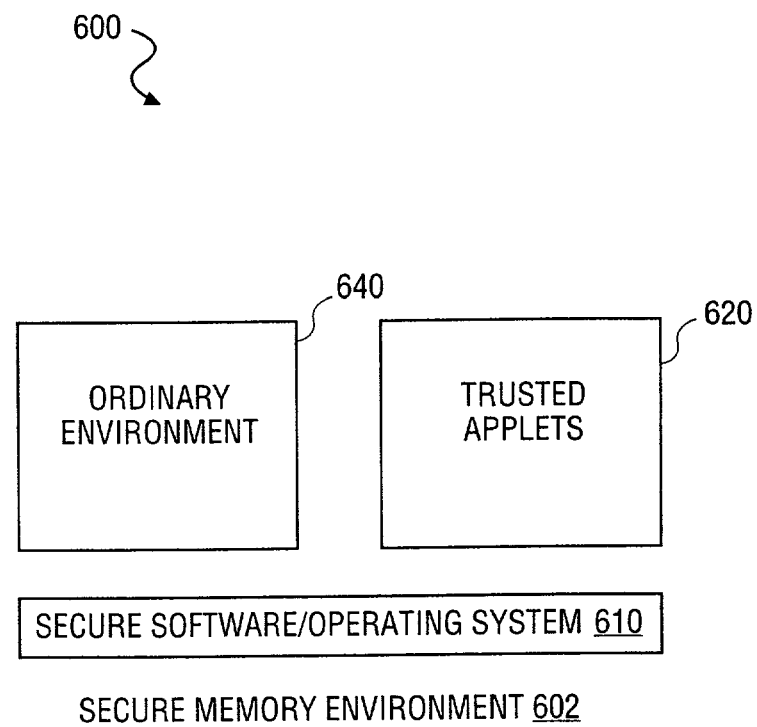

Consequently, as depicted in FIG. 5B, the secure memory region 602 will contain secured software/operating system code 610, as described above, which will be contrasted from the ordinary environment applications 640. As such, once the secure memory environment 602 is formed, the secure software 610 may either run to completion or initiate trusted applications (applets) 620, which may perform further functions as desired. Accordingly, as described above, the identity of the trustable operating system is recorded in the digest 460 and following an SRESET command, all processors will begin executing code belonging to that trustable operating system.

As a result, an outside entity may later request a signed version of the digest and be able to evaluate whether the system is in a trustable state. In one embodiment, the LSR and SRESET operations described above, may be exposed to initiating software in several ways, for example through I/O port accesses, memory accesses, instructions or the like. In one embodiment, the LSR operation is implemented as an instruction and the SRESET is implemented as a command to the platform chipset.

Accordingly, the LSR operation may be implemented in processor microcode. In addition, the SRESET command may be implemented by the chipset logic. Furthermore, the processor resources may be used to implement the functionality of the memory hashing engine 470 (FIG. 4). That is, the memory hashing engine 470 may be a microcode sequence which leverages the compute sequences resources of the processor 402. In alternate embodiments, the memory hashing engine 470 may be implemented in either the memory controller 410 or I/O controller 430.

However, due to the fact that the LSR functionality is implemented in a processor, the platform will be able to distinguish between messages which are generated by the hashing engine 470 and those that are generated by general purpose initiation software. In one embodiment, a special message type is introduced, which is only available to the LSR memory hashing microcode. Consequently, macrocode software will be devoid of a mechanism to generate these types of messages. In one embodiment, the SRESET command may be a simple write to a certain I/O port address, which is decoded by the chipset. As a result, chipset then may take the actions described as the SRESET command.

While the memory protection element 420 is depicted as being integrated into the memory controller 410 as depicted in FIG. 4, those skilled in the art will appreciate that this mechanism can be implemented and distributed throughout the system 400 with the functionality appearing in the I/O controller and processors. Moreover, the digest and digest signing agent may be integrated into any of the chipset components described or may be implemented as separate platform devices. In the embodiment described, these components are illustrated as separate devices connected to the I/O controller 430. Procedural methods for implementing the teachings of the present invention are now described.

Operation

Figure 6:
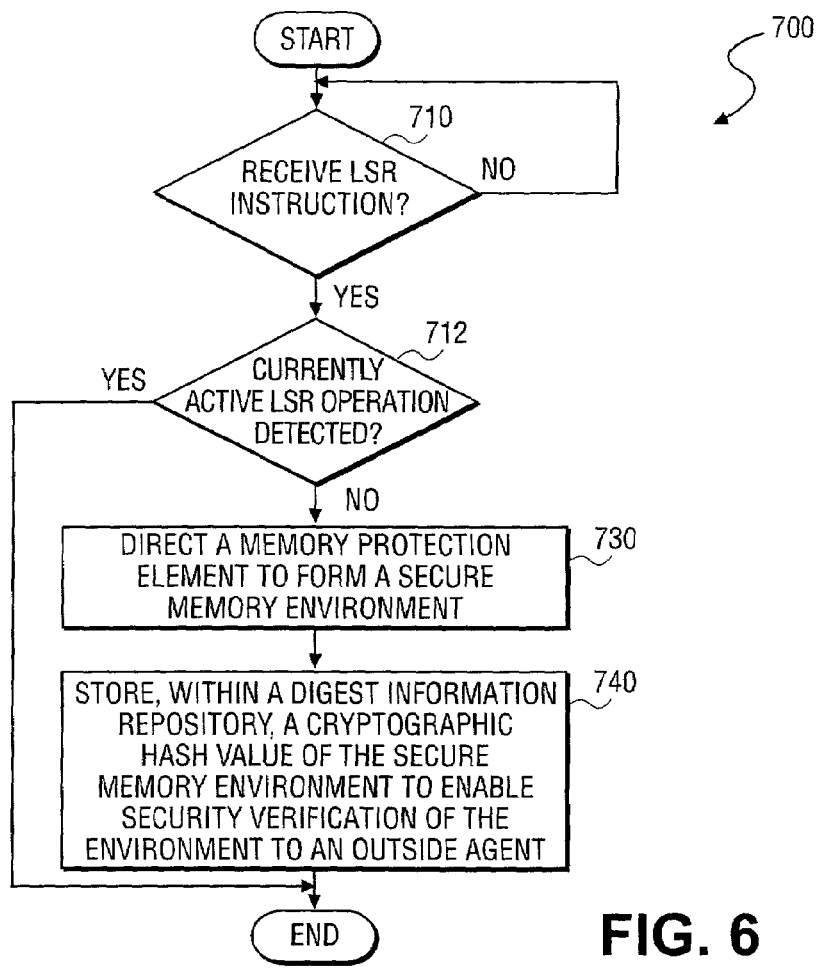
FIG. 6 depicts a flowchart illustrating a method for unilaterally loading a secure operating system within a multiprocessor environment in accordance with one embodiment of the present invention.

Referring now to FIG. 6, FIG. 6 depicts a flowchart illustrating a method 700 for unilaterally loading a secure operating system within a multiprocessor environment, for example as depicted in FIG. 4. At process block 710, it is determined whether a load secure region (LSR) instruction (load instruction) has been received. Once an LSR instruction is received, process block 712 is performed. At process block 712, it is determined whether a currently-active LSR operation (load operation) is detected. This check is performed because any of the processors may each receive an LSR instruction request from initiating software.

In other words, as described above, the mechanisms described herein provide a technique for the unilateral creation, by an initiating processor, to form a secure memory environment in response to, for example security initiation software. As such, when an LSR instruction is received, the receiving processor determines whether another processor has already received an LSR instruction which is currently being performed (current LSR operation). Accordingly, when a current LSR operation is detected, the received LSR instruction will be discarded. Otherwise, process block 730 is performed.

Consequently, process block 730 is performed once it is verified that another processor is not performing an LSR instruction. At process block 730, the receiving processor will direct a memory protection element 420 to form a secure memory environment, as indicated by the LSR instruction. Finally, at process block 740, the processor will store a cryptographic hash value of the secure memory environment within a digest information repository 460. As described, the storing of the hash value, or secure software identification value, is utilized to enable security verification of the environment to an outside agent.

Figure 7:
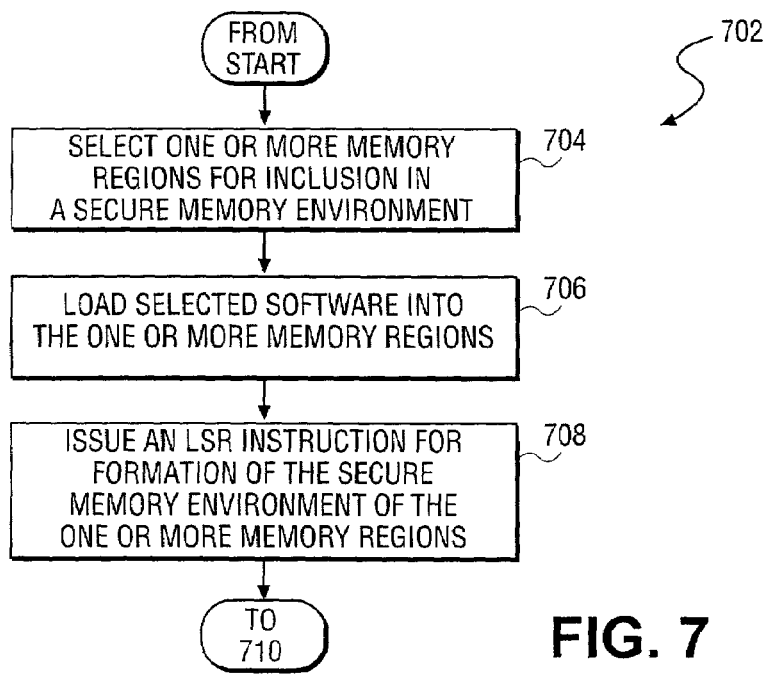
FIG. 7 depicts a flowchart illustrating an additional method for loading an operating system within a memory region which will become a secure memory environment in accordance with an embodiment of the present invention.

Referring now to FIG. 7, FIG. 7 depicts a flowchart illustrating an additional method 702 for initiation of an LSR instruction via security initiation software. At process block 704, the security initiation software will select one or more memory regions for inclusion as the secure memory environment. Once selected, at process block 706 the initiation software will direct a processor to load selected software or an operating system within a memory region of the one or more memory regions. Finally, at process block 708, the initiation software will issue an LSR instruction for formation of the secure memory region as the one or more memory regions to a selected processor. Once performed, control flow branches to process block 710 of FIG. 6.

Figure 8:
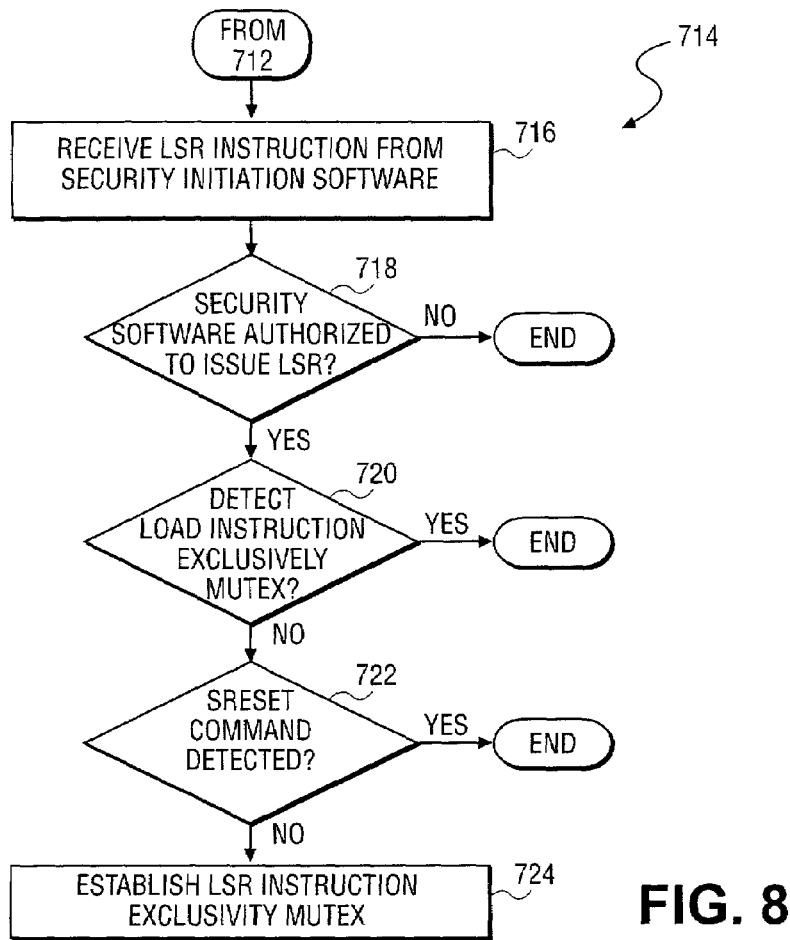
FIG. 8 depicts a flowchart illustrating an additional method for disregarding a received LSR instruction in accordance with the further embodiment of the present invention.

Referring now to FIG. 8, FIG. 8 depicts a flowchart illustrating actions performed by a receiving processor in response to receipt of an LSR instruction from security initiation software. At process block 716, the processor will receive an LSR instruction from security initiation software. Once received, at process block 718, the processor will determine whether the security initiation software is authorized to issue the LSR instruction. When the initiation software is unauthorized, the LSR instruction is disregarded. Otherwise, at process block 720, the processor will determine if an LSR operation exclusivity mutex is detected. As described above, an exclusivity mutex enables an initiating processor to inform any of the other processors that an LSR instruction is currently being performed.

When an exclusivity mutex is detected, the received LSR instruction is disregarded. Otherwise, at process block 722, it is determined whether a secure reset (SRESET) command is detected. As will be described in further detail below, the SRESET command is utilized by the initiating processor to force each of the processors to accept the secure memory region/environment and begin performing operations within the operating system of the secure memory environment. When an SRESET command is detected, the received LSR instruction is disregarded. Otherwise, at process block 724, the processor will establish an LSR operation exclusivity mutex for the reasons described above. Once performed, control flow branches to process block 730, as depicted in FIG. 6.

Figure 9:
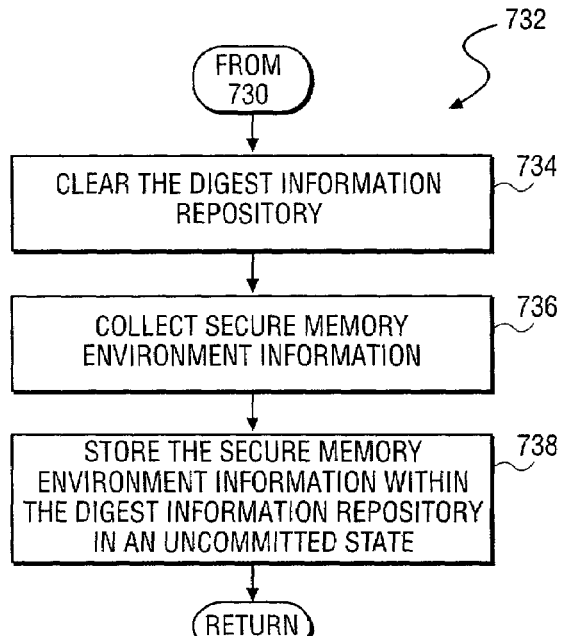
FIG. 9 depicts a flowchart illustrating an additional method for creating a secure memory environment in accordance with a further embodiment of the present invention.

Referring now to FIG. 9, FIG. 9 depicts an additional method 732 for directing a memory protection element 420 to form the secure memory environment of process block 730 as depicted in FIG. 6. At process block 734, the memory protection element 420 will clear the digest information repository. Once cleared, at process block 736, the memory protection element 420 will collect the secure memory environment information. In one embodiment, the secure memory environment information may include secure software identification information, processor versions, state information and the like. As such, the collection of the secure memory information provides registration of the software or operating system initially loaded by the initiation software. Finally, at process block 738, the memory protection element 420 will store the secure memory environment information within the digest information repository 460. Once stored, the software or operating system is registered as the secure software or secure operating system within the secure memory environment.

Figure 10:
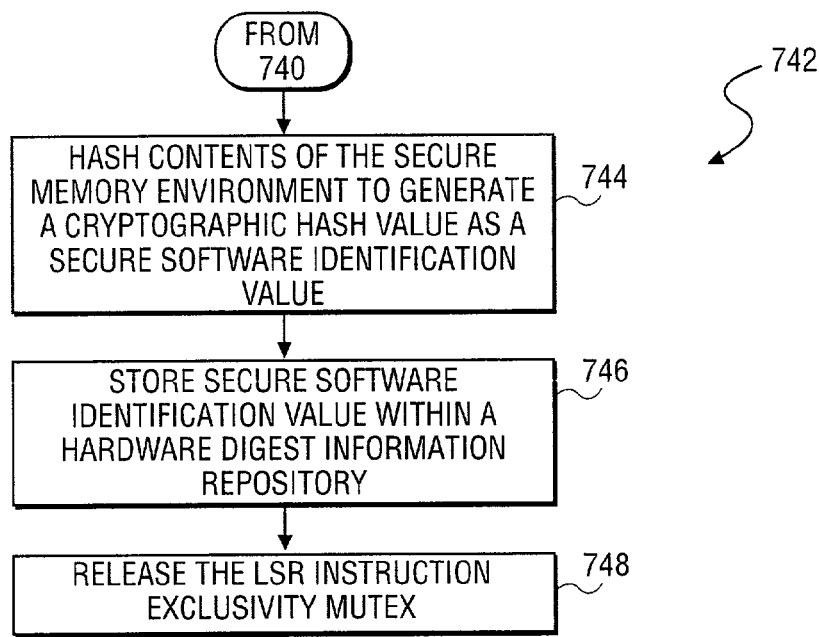
FIG. 10 depicts a flowchart illustrating an additional method for completing formation of a secure memory environment in accordance with a further embodiment of the present invention.

Referring now to FIG. 10, FIG. 10 depicts a flowchart illustrating an additional method 742 for generating the cryptographic hash value or secure software identification value of process block 740, as depicted in FIG. 6. At process block 744, the memory hashing engine 470 will hash contents of the secure memory environment to generate a cryptographic hash value as a secure software identification value. Next, at process block 746, the hashing engine 470 will store the secure software identification value within a hardware digest information repository 460. Once this is performed, the security memory environment, as well as the secure software, has been identified and registered. Accordingly, at process block 748, the processor will release the LSR operation exclusivity mutex to enable other processors within the system to perform an LSR instruction.

Figure 11:
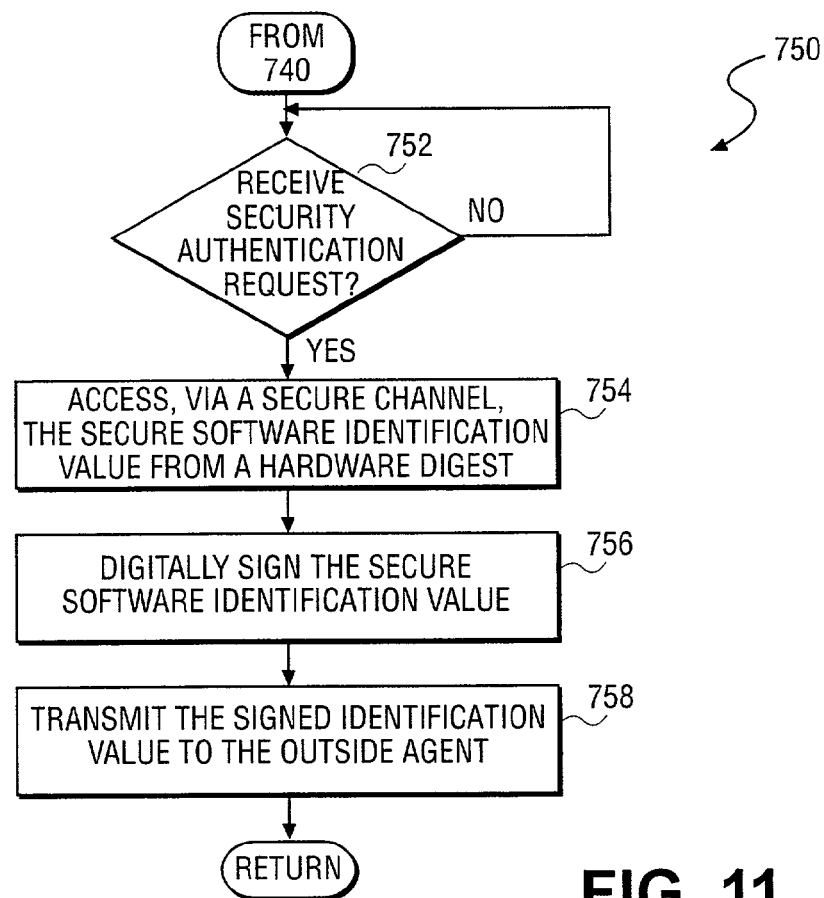
FIG. 11 depicts a flowchart illustrating a method for establishing security verification of the secure memory environment to an outside agent in accordance with a further embodiment of the present invention.

Referring now to FIG. 11, FIG. 11 depicts a method 750 for security verification of the secure memory environment to an outside agent. At process block 752, it is determined whether a security authentication request is received from an outside agent. Once received, at process block 754 the digest signing engine 452 will access the secure software identification value, via the secure channel 754, from the hardware digest 460. Once accessed, at process block 756 the digest signing engine 452 will digitally sign the secure software identification value. Finally, at process block 758 the signed identification value is transmitted to the outside agent.

Figure 12:
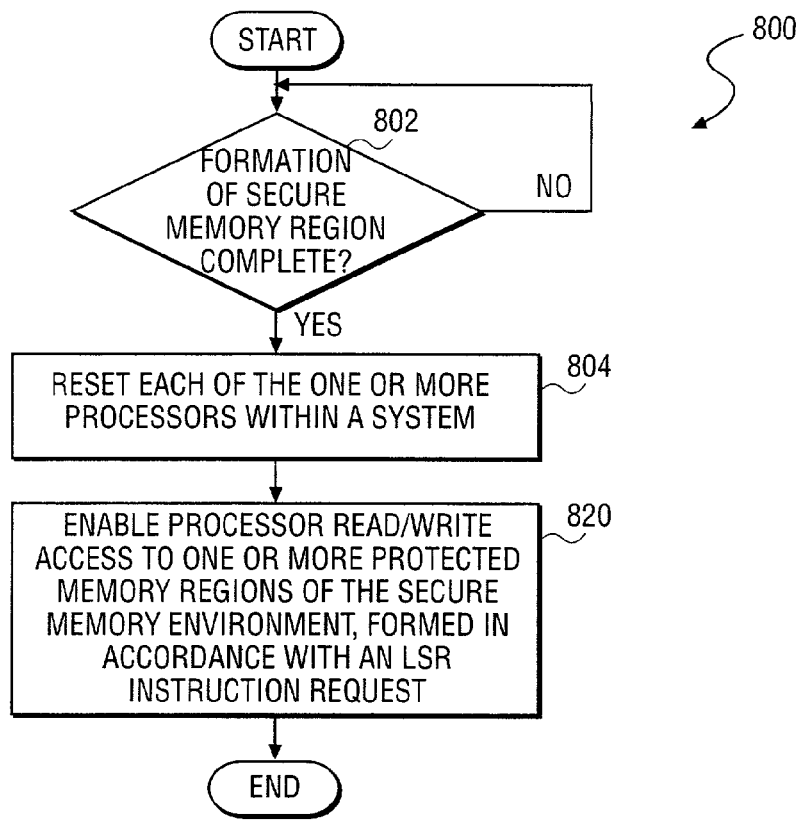
FIG. 12 depicts a flowchart illustrating a method performed in response to an SRESET command in accordance with one embodiment of the present invention.

Referring now to FIG. 12, FIG. 12 depicts a method 800 which illustrates the secure reset (SRESET) command, as described above, for example within the computer system 400 as depicted in FIG. 4. At process block 802, it is determined whether formation of the secure memory region is complete. In one embodiment, this may be determined by verifying whether information within the digest 460 has been committed following completion of an LSR instruction via an initiating processor. Once formation is complete, process block 804 is performed. At process block 804, the initiating processor will issue a reset command to the plurality of processors 400 within the system 400. Once reset, at process block 820 the processor will enable read/write access to the one or more protected memory regions of the secure memory environment to each of the processors. As such, once read/write access is enabled, all processors will begin executing code belonging to the trustable operating system.

Figure 13:
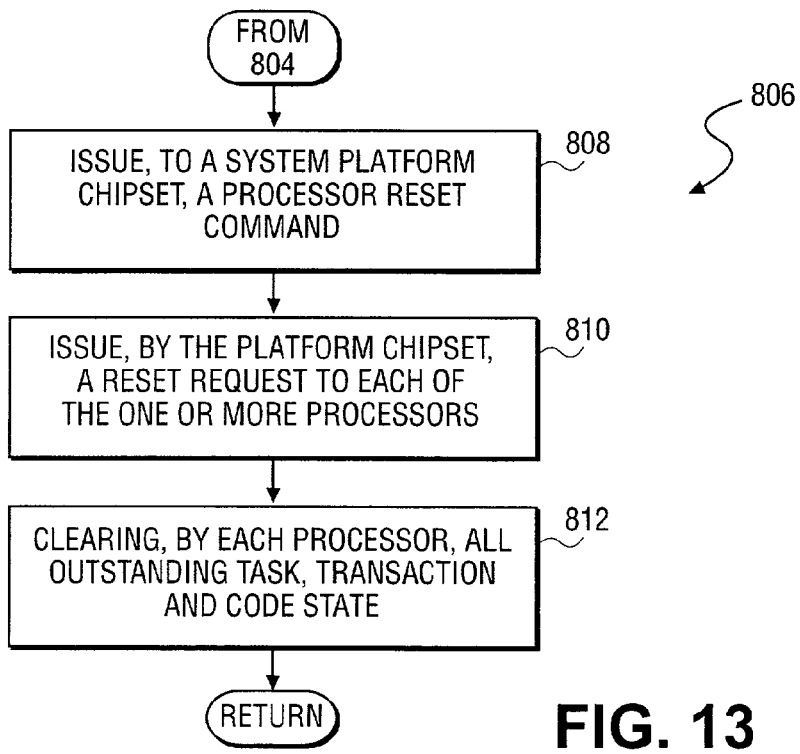
FIG. 13 depicts a flowchart illustrating an additional method for resetting one or more processors in response to receipt of an SRESET command in accordance with the further embodiment of the present invention.

Referring now to FIG. 13, FIG. 13 depicts a flowchart illustrating an additional method 806 performed in response to the reset command of process block 804 as depicted in FIG. 12. At process block 808, the processor will issue to a system platform chipset, a processor reset command. Once issued, at process block 810 the chipset platform or the platform chipset will issue a reset request to each of the plurality of processors of the computer system 400. Once issued, at process block 812 each processor will clear all outstanding tasks, transactions, cache memory and the like such that outside actions do not result in, for example a system memory interrupt.

Figure 14:
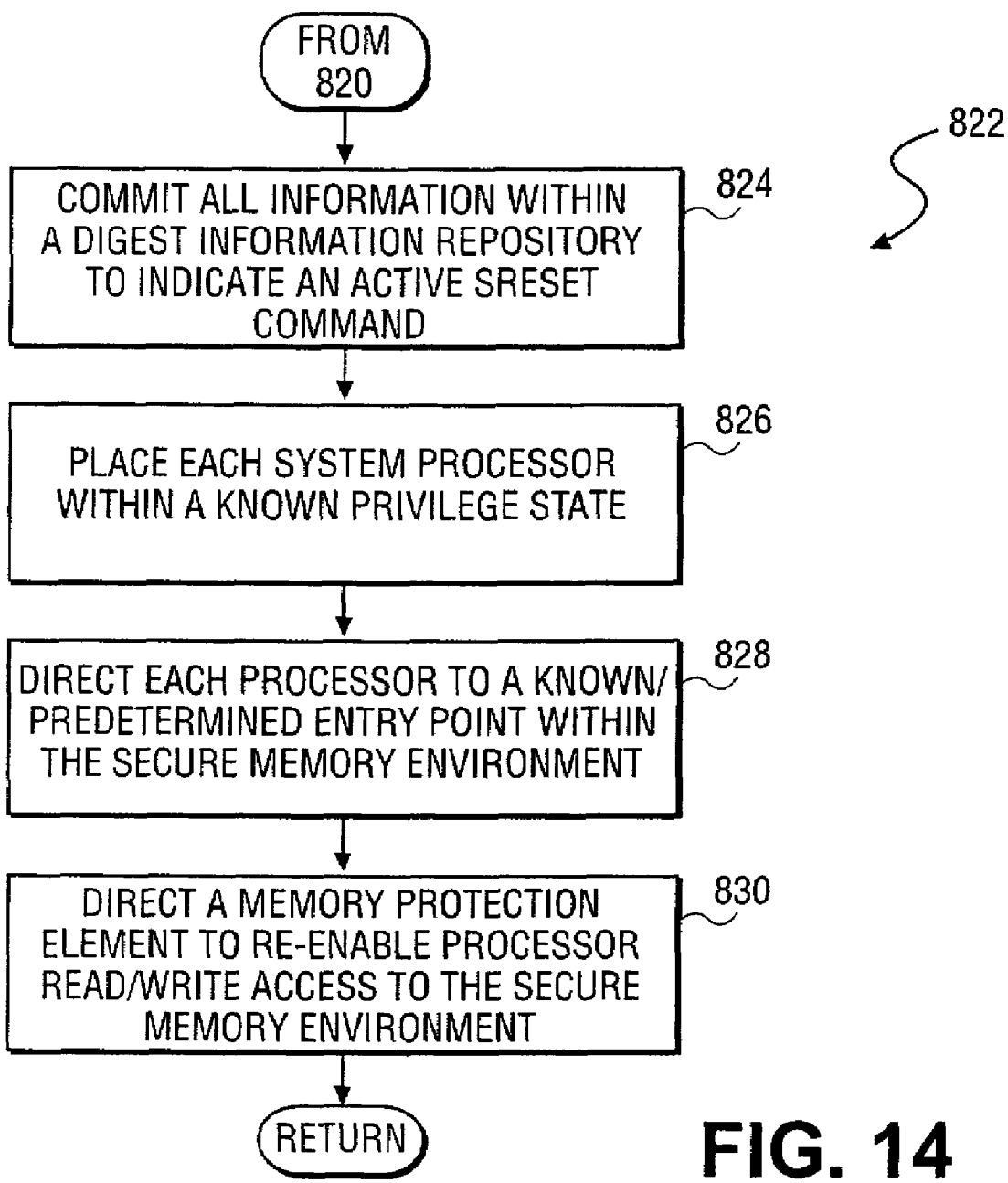
FIG. 14 depicts a flowchart illustrating an additional method for re-enabling processor read-write access to a secure memory environment formed in accordance with an exemplary embodiment of the present invention.

Finally, referring to FIG. 14, FIG. 14 depicts a flowchart illustrating an additional method 822 for enabling processor read/write access of process block 820, as depicted in FIG. 12. At process block 824, the processor will commit all information within the digest information repository 460 to indicate an active SRESET command. Once committed, at process block 826 each of the plurality of processors 402 within the system 400 will be placed within a known privilege state or high privilege state available in the computer system 400.

Next, at process block 828 each processor will be directed to a known state which may include, for example, a one of a plurality of known privileged states ($S_1, S_2, \ldots, S_n$), an operating mode, register and control values as well as a predetermined entry point within the secure memory region, for example as depicted in FIG. 5A. Finally, at process block 830, a memory protection element 420 will be directed to re-enable processor read/write access to the secure memory environment. In this way, the identity of the trustable operating system is recorded in the digest and following an SRESET, all processors will begin executing codes belonging to that trustable operating system. Moreover, an outside agent may later request a signed version of the digest and be able to evaluate whether the system is in a trustable state.

ALTERNATE EMBODIMENTS

Several aspects of one implementation of the secure memory environment multiprocessor system for providing unilateral loading of a secure operating system within a multiprocessor environment have been described. However, various implementations of the secure memory environment multiprocessor system provide numerous features including, complementing, supplementing, and/or replacing the features described above. Features can be implemented as part of the same silicon, multiple die, a combination of both or as part of the microcode, or as specific hardware or software components in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a secure memory environment multiprocessor system, it will be appreciated by those skilled in the art that the teaching of the present invention can be applied to other systems. In fact, systems for unilaterally loading a verifiable trustable operating system are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. The present invention includes the ability to unilaterally load a secure operating system within a multiprocessor environment. The present invention provides a mechanism by which a system may install a trustable operating system within a secure memory environment. Accordingly, a user or system administrator may utilize an LSR instruction followed by an SRESET instruction, as described above, to load a trustable operating system. Once completed, an outside agent may later inspect the system and determine whether a given operating system was loaded and if so, if it had been loaded into a secure environment or not. Consequently, this described mechanism is of particular interest because it allows the trustable operating system to be loaded after untrusted software components have run. Further, the mechanism is robust in the presence of malicious software that may be attempting to compromise the computer system from another processor in a multiprocessor system while the system is registering trustable software components.

Having disclosed exemplary embodiments and the best mode, modifications and variations may be made to the disclosed embodiments while remaining within the scope of the invention as defined by the following claims.

What is claimed is:

1. A method comprising:

disregarding a received load instruction when a currently active load operation is detected;

otherwise, directing, in response to the received load instruction, a memory protection element to form a secure memory environment including one or more protected memory regions, such that unauthorized read/write access to the one or more protected memory regions is prohibited; and storing, within a digest information repository, a cryptographic hash value of the one or more protected memory regions, thereby enabling establishment of security verification of the secure memory environment.

2. The method of claim 1, wherein disregarding further comprises:

receiving a load secure region instruction as the load instruction from security initiation software, such that the load secure region instruction indicates the one or more memory regions to be established as the secure memory environment;

verifying that the security initiation software possesses a sufficient privilege level to issue the load secure region instruction;

once verified, determining whether a currently active load secure region operation exclusivity mutex exists;

when a currently active load secure region operation exclusivity mutex is detected, disregarding the received load secure region instruction request; and otherwise establishing a load secure region instruction exclusivity mutex.

3. The method of claim 1, wherein disregarding further comprises:
determining whether a secure reset command has been received; and
when a secure reset command has been received, disregarding the received load instruction request.

4. The method of claim 3, wherein determining further comprises:
querying values within the digest information repository; and
when values within the digest information repository are committed, detecting receipt of a reset command.

5. The method of claim 1, wherein directing further comprises:
determining the one or more protected memory regions from the received load instruction request; and
providing a request, including parameters of the one or more protected memory regions, to a memory protection element, such that the memory protection element establishes the secure memory environment requested by a load secure region operation according to the load instruction.

6. The method of claim 1, wherein direct further comprises:
clearing the digest information repository; and
recording secure environment information within the digest information repository.

7. The method of claim 1, wherein storing further comprises:
hashing contents of the secure memory region to generate a cryptographic hash identification value as a secure software identification value for software contained within the secure environment; and
storing the secure software identification value within the digest information repository; and
releasing a load operation exclusivity mutex.

8. The method of claim 1, further comprising:
receiving a security authentication request from an outside agent;
accessing, via a secure channel, a secure software identification value;
digitally signing the software identification value; and
transmitting the digitally signed secure software identification value to the outside agent, such that the outside agent may examine a component state of secure software within the secure memory environment and decide whether to trust the secure software.

9. The method of claim 1, further comprising:
issuing a processor reset request to a system chipset; and
resetting, by the chipset, all processors coupled to the chipset in response to the processor reset request.

10. A method comprising:
resetting, in response to a secure reset request, one or more processors within a system, the secure reset request issued following completion of a load secure region operation; and
enabling processor read/write access to one or more protected memory regions of a secure memory environment formed in accordance with a load secure region instruction request to establish a secure environment.

11. The method of claim 10, wherein resetting further comprises:
issuing, to a system chipset platform, a processor reset command; and
issuing, by the chipset platform, a reset request to each of the one or more processors.

12. The method of claim 11, wherein issuing further comprises:
performing a data write to an input/output port address; and
decoding, by the chipset platform, the data write to detect a processor reset command.

13. The method of claim 10, wherein re-enabling further comprises:
committing data within a digest information repository to indicate a currently active reset command;
causing each of the processors coupled to the system to enter a known privilege state; and
directing a memory protection element to re-enable processor read/write access to the secure memory environment.

14. The method of claim 13, wherein causing comprises:
setting data storage elements within the one or more processors to one of the constant values stored in/generated by the processor and values derived from parameters specified by security initiation software at issuance of the load secure region instruction.

15. A computer readable storage medium including program instructions that direct a computer to function in a specified manner when executed by a processor, the program instructions comprising:
disregarding a received load instruction when a currently active load instruction is detected;
otherwise, directing, in response to the received load instruction, a memory protection element to form a secure memory environment including one or more protected memory regions, such that unauthorized read/write access to the one or more protected memory regions is prohibited; and
storing, within a digest information repository, a cryptographic hash value of the one or more protected memory regions, thereby enabling establishment of security verification of the secure environment.

16. The computer readable storage medium of claim 15, wherein disregarding further comprises:
receiving an instruction as the load secure region instruction from security initiation software, such that the load secure region instruction indicates the one or more memory regions to be established as the secure memory environment, as well as secure software loaded within the secure memory environment;
verifying that the security initiation software possesses a sufficient privilege level to issue the load secure region instruction;
once verified, determining whether a currently active load operation exclusivity mutex exists;
when a currently active load operation exclusivity mutex is detected, disregarding the received load secure region instruction request; and
otherwise establishing a load secure region operation exclusivity mutex.

17. The computer readable storage medium of claim 15, wherein disregarding further comprises:
determining whether a secure reset command has been received; and
when a secure reset command has been received, disregarding the received load instruction request.

18. The computer readable storage medium of claim 17, wherein determining further comprises:
querying values within a digest information repository; and when values within the digest information repository are committed, detecting receipt of a reset command.

19. The computer readable storage medium of claim 15, wherein directing further comprises:
    determining the one or more protected memory regions from the received load instruction request; and
    providing a request including parameters of the one or more protected memory regions to a memory protection element, such that the memory protection element establishes the secure memory region requested by a load secure region operation according to the load instruction.

20. The computer readable storage medium of claim 15, wherein programming further comprises:
    clearing the digest information repository; and
    recording security environment information within the digest information repository.

21. The computer readable storage medium of claim 15, wherein storing further comprises:
    hashing contents within the secure memory environment to generate a cryptographic hash value as a secure software identification value for software loaded within the secure memory environment;
    storing the secure software identification value within the digest information repository; and
    releasing a load operation exclusivity mutex.

22. The computer readable storage medium of claim 15, further comprising:
    receiving a security authentication request from an outside agent;
    accessing, via a secure channel, a software identification value;
    digitally signing the software hash identification value; and
    transmitting the digitally signed software identification value to the outside agent, such that the outside agent may examine a component state of secure software within the secure memory environment and decide whether to trust the secure software.

23. The computer readable storage medium of claim 15, further comprising:
    issuing a processor reset request to a system chipset; and
    resetting, by the chipset, all processors coupled to the chipset in response to the processor reset request.

24. A computer readable storage medium comprising:
    resetting, in response to a secure reset request, one or more processors within a system, the secure reset request issued following completion of a load secure region operation; and
    re-enabling processor read/write access to one or more protected memory regions of a secure memory environment formed in accordance with a load secure region instruction to establish a secure environment.

25. The computer readable storage medium of claim 24, wherein resetting further comprises:
    issuing, to a system chipset platform, a processor reset command; and
    issuing, by the chipset platform, a reset request to each of the one or more processors.

26. The computer readable storage medium of claim 25, wherein issuing further comprises:
    performing a data write to an input/output port address; and
    decoding, by the chipset platform, the data right to detect a processor reset command.

27. The computer readable storage medium of claim 24, wherein re-enabling further comprises:
    committing data within a digest information repository to indicate a currently active reset command;
    causing each of the processors coupled to the system to enter a known privilege state; and
    programming a memory protection element to re-enable processor read/write to the secure memory environment.

28. The computer readable storage medium of claim 27, wherein each of the processors further comprises:
    setting data storage elements within the processor to one of the constant values stored in/generated by the processor and values derived from parameters specified by security initiation software at issuance of the load secure region instruction.

29. An apparatus, comprising:
    a memory controller;
    a plurality of processors, each coupled to the memory controller and each having circuitry to execute instructions;
    a memory protection element coupled to the memory controller, the memory protection element to block unauthorized memory access to one or more protected memory regions;
    a digest information repository coupled to the memory controller to store a secure software identification value; and
    a memory device coupled to the memory controller, having sequences of instructions stored therein, including at least one loading instruction, which when executed by a processor cause the processor to:
        disregard a received load secure region instruction when a currently active load secure region operation is detected,
        otherwise, direct, in accordance with a load secure region operation corresponding to the received load secure region instruction, a memory protection element to form a secure memory environment including one or more protected memory regions, such that unauthorized read/write access to the one or more protected memory regions is prohibited, and
        store, according to the load secure region operation, within the digest information repository, a cryptographic hash value of the one or more protected memory regions as the secure software identification value, thereby enabling establishment of security verification of the secure memory environment by an outside agent.

30. The apparatus of claim 29, wherein the processor is further caused to:
    receive a security authentication request from an outside agent;
    access, via a secure channel, a secure software identification value;
    digitally sign the secure software identification value; and
    transmit the digitally signed secure software identification value to the outside agent, such that the outside agent may examine a component state of secure software within the secure memory environment and decide whether to trust the secure software.

31. The apparatus of claim 29, wherein the processor is further caused to:
    reset, in response to a secure reset request, each of the plurality of processors, the secure reset request issued following completion of the load instruction; and
    re-enable processor read/write access to the one or more protected memory regions of the secure memory environment formed in accordance with the load secure region operation to establish a secure environment.

32. The apparatus of claim 29, wherein the instruction to re-enable further causes the processor to:
   commit data within a digest information repository to indicate a currently active secure reset command;
   cause each of the processors coupled to the system to enter a known privilege state; and
   direct a memory protection element to re-enable processor read/write access to the secure memory environment.

33. The apparatus of claim 32, wherein the instruction to cause processors to enter a privilege state further causes the processor to:
   set data storage elements within the plurality of processors to one of the constant values stored in/generated by the processor and values derived from parameters specified by security initiation software at issuance of the load secure region instruction.

34. A system comprises:
   a memory controller;
   a plurality of processors, each coupled to the memory controller and each having circuitry to execute instructions;
   a memory protection element coupled to the memory controller, the memory protection element to block unauthorized memory access to one or more protected memory regions;
   an I/O controller coupled to the memory controller;
   a verification unit coupled to the I/O controller and including a digest information repository to store a secure software identification value and to provide security verification to an outside agent; and
   a storage device coupled to the memory controller, having sequences of instructions stored therein including at least one load instruction, which when executed by a processor causes the processor to:
   disregard a received load secure region operation when a currently active load instruction is detected,
   otherwise, direct, in accordance with a load secure region operation corresponding to the received load instruction, a memory protection element to form a secure memory environment including one or more protected memory regions, such that unauthorized read/write access to the one or more protected memory regions is prohibited, and
   store, within the digest information repository, a cryptographic hash value of the one or more protected memory regions, thereby enabling establishment of security verification of the secure memory environment by an outside agent.

35. The system of claim 34, wherein the processor is further caused to:
   receive a security authentication request from an outside agent;
   access, via a secure channel, a secure software identification value;
   digitally sign the secure software identification value; and
   transmit the digitally signed secure software identification value to the outside agent, such that the outside agent may examine a component state of secure software within the secure memory environment and decide whether to trust the secure software.

36. The system of claim 34, wherein the processors is further caused to:
   reset, in response to a secure reset request, each of the plurality of processors, the secure reset request issued following completion of the load secure region instruction request; and
   re-enable processor read/write access to the one or more protected memory regions of the secure memory environment formed in accordance with the load secure region operation to establish a secure environment.

37. The system of claim 34, wherein the instruction to re-enable further causes the processor to:
   commit data within a digest information repository to indicate a currently active secure reset command;
   cause each of the plurality of processors to enter a known privilege state; and
   direct a memory protection element to re-enable processor read/write access to the secure memory environment.

38. The system of claim 37, wherein the instruction to cause processors to enter a privilege state further causes the processor to:
   set data storage elements within the plurality of processors to one of the constant values stored in/generated by the processor and values derived from parameters specified by security initiation software at issuance of the load secure region instruction.

* * * * *